US008438225B2

(12) United States Patent
Serr et al.

(10) Patent No.: US 8,438,225 B2
(45) Date of Patent: *May 7, 2013

(54) TRAVERSING BETWEEN ELECTRONIC MAIL AND REAL TIME COMMUNICATIONS

(75) Inventors: Robert W. Serr, Kirkland, WA (US); Amit Gupta, Redmond, WA (US); Mark McClelland, Seattle, WA (US); Scott Huddleston, Redmond, WA (US); Santhosh Misro, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/477,593

(22) Filed: Jun. 3, 2009

(65) Prior Publication Data

US 2010/0312836 A1  Dec. 9, 2010

(51) Int. Cl.
*G06F 15/16* (2006.01)

(52) U.S. Cl.
USPC ............................................ 709/204; 709/206

(58) Field of Classification Search ........... 709/204–207
See application file for complete search history.

(56) References Cited

U.S. PATENT DOCUMENTS

| | | | | |
|---|---|---|---|---|
| 7,516,186 B1* | 4/2009 | Borghetti et al. | ............ | 709/206 |
| 7,664,814 B2* | 2/2010 | Little, II | ........................ | 709/204 |
| 7,751,347 B2* | 7/2010 | Giroti | ........................... | 370/260 |
| 2004/0078446 A1* | 4/2004 | Daniell et al. | ................ | 709/206 |
| 2005/0132012 A1* | 6/2005 | Muller et al. | ................ | 709/206 |
| 2005/0251555 A1* | 11/2005 | Little | ............................. | 709/206 |
| 2006/0167709 A1* | 7/2006 | Jung et al. | ......................... | 705/1 |
| 2006/0190546 A1* | 8/2006 | Daniell | ........................ | 709/206 |
| 2006/0259923 A1* | 11/2006 | Chiu | ................................ | 725/24 |
| 2007/0022213 A1* | 1/2007 | Fahmy et al. | ................. | 709/246 |
| 2007/0061423 A1* | 3/2007 | Accapadi et al. | ............. | 709/219 |
| 2007/0143426 A1* | 6/2007 | Jaquinta | ....................... | 709/206 |
| 2007/0179945 A1* | 8/2007 | Marston et al. | .................... | 707/5 |
| 2007/0185961 A1* | 8/2007 | Perlow et al. | ................. | 709/206 |
| 2007/0185964 A1* | 8/2007 | Perlow et al. | ................. | 709/207 |
| 2007/0186172 A1* | 8/2007 | Sego et al. | .................... | 715/753 |
| 2007/0233794 A1* | 10/2007 | Singh | ........................... | 709/206 |
| 2008/0059587 A1* | 3/2008 | Burtner et al. | ................. | 709/206 |
| 2008/0208984 A1* | 8/2008 | Rosenberg et al. | ........... | 709/206 |
| 2008/0222256 A1* | 9/2008 | Rosenberg et al. | ........... | 709/206 |
| 2009/0006558 A1* | 1/2009 | Taieb et al. | ................... | 709/206 |
| 2009/0006980 A1* | 1/2009 | Hawley et al. | ................ | 715/752 |

(Continued)

OTHER PUBLICATIONS

"Email Your Yahoo! Chat Conversation with "Convert to Email"", Retrieved at <<http://www.techmalaya.com/2007/09/14/email-your-yahoo-chat-conversation-with-convert-to-email/>>, Sep. 14, 2007, pp. 6.

(Continued)

*Primary Examiner* — Patrice Winder
*Assistant Examiner* — Julian Chang
(74) *Attorney, Agent, or Firm* — Turk IP Law, LLC

(57) ABSTRACT

Users are enabled to traverse seamlessly between electronic mail and real time communications such as text messaging, group chats, and similar forms. A context of communications such as a history of the email exchange, attached or related documents, links, trail of exchanged text messages, and comparable information is used to automatically determine addressees for the communication form after the traverse and to provide context information.

18 Claims, 8 Drawing Sheets

U.S. PATENT DOCUMENTS

| | | | |
|---|---|---|---|
| 2009/0024706 A1* | 1/2009 | Janakiraman et al. | 709/206 |
| 2009/0025063 A1* | 1/2009 | Thomas | 726/4 |
| 2009/0106365 A1* | 4/2009 | Drory et al. | 709/206 |
| 2009/0112995 A1* | 4/2009 | Addae et al. | 709/206 |
| 2009/0164588 A1* | 6/2009 | D'Amato et al. | 709/206 |
| 2009/0282493 A1* | 11/2009 | Bhide et al. | 726/28 |
| 2009/0282494 A1* | 11/2009 | Bhide et al. | 726/28 |
| 2009/0319623 A1* | 12/2009 | Srinivasan et al. | 709/206 |
| 2009/0319918 A1* | 12/2009 | Affronti et al. | 715/753 |
| 2010/0017753 A1* | 1/2010 | Li et al. | 715/810 |
| 2010/0023585 A1* | 1/2010 | Nersu et al. | 709/206 |
| 2010/0077029 A1* | 3/2010 | Shook et al. | 709/204 |
| 2010/0105437 A1* | 4/2010 | Lee et al. | 455/566 |
| 2010/0161749 A1* | 6/2010 | Muller et al. | 709/206 |
| 2010/0250693 A1* | 9/2010 | Zheng et al. | 709/206 |
| 2011/0029629 A1* | 2/2011 | Burtner et al. | 709/206 |

OTHER PUBLICATIONS

"About Gmail", Retrieved at <<http://mail.google.com/mail/help/chat.html>>, Mar. 25, 2009, pp. 3.

"Belkasoft Universal IM History Extractor Pro 2.04", Retrieved at <<http://www.download3k.com/Internet/Instant-Messengers-Chat/Download-Belkasoft-Universal-IM-History-Extractor-Pro.html>>, Mar. 25, 2009, pp. 3.

"IceWarp", Retrieved at <<http://www.icewarp.com/products/instant_messaging/>>, Mar. 25, 2009, pp. 6.

"Using Text Messaging", Retrieved at <<http://help.yahoo.com/tutorials/cg/mail/cg_text4.html>>, Mar. 25, 2009, pp. 5.

"mail2sms", Retrieved at <<http://daniel.haxx.se/projects/mail2sms/>>, Mar. 25, 2009, pp. 3.

* cited by examiner

TRAVERSING BETWEEN ELECTRONIC MAIL AND REAL TIME COMMUNICATIONS

BACKGROUND

Electronic mail ('email') and real time conversations (e.g. text messaging, group chat) are two of the commonly used methods of communication in daily professional and personal lives. The conceptual data model used in most email systems is derived from a simple filing cabinet metaphor. Messages are 'stored' in a hierarchy of folders. Those folders can have distinct properties (e.g. name of the folder, size of the folder, who is allowed to manipulate that folder, and in what way) and are themselves 'stored' in a mailbox (a filing cabinet). Moreover, exchanged messages may also include a trail of past related messages, related documents (e.g. attachments), links to reference documents or network locations, and similar items.

Real time communications are modeled after their namesake. They typically include exchanges of brief textual (and in some cases graphical) messages transferred between participants in a rapid fashion. Real time exchanges like instant messages or group chats may also include related documents, images, links, etc., but those are commonly more limited than a typical email exchange.

Users in conventional communication systems may respond to an email with a text message or vice versa. However, the systems are not equipped to provide a seamless transition between the two forms of communication, and a significant amount of information may be lost during the transition by the user unless the user manually performs a number of tasks to provide integration between the two communications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a seamless traverse means between electronic mail exchanges and real time communications such as text messaging, group chat, and similar forms. A context of communications such as a history of the email exchange, attached or related documents, links, and comparable information is automatically provided when a user switches from email to real time communication. Conversely, real time communication context such as exchanged message trail may be provided in traversing to email. Addressees of either communication form may also be automatically determined from a context of the communication along with other parameters.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
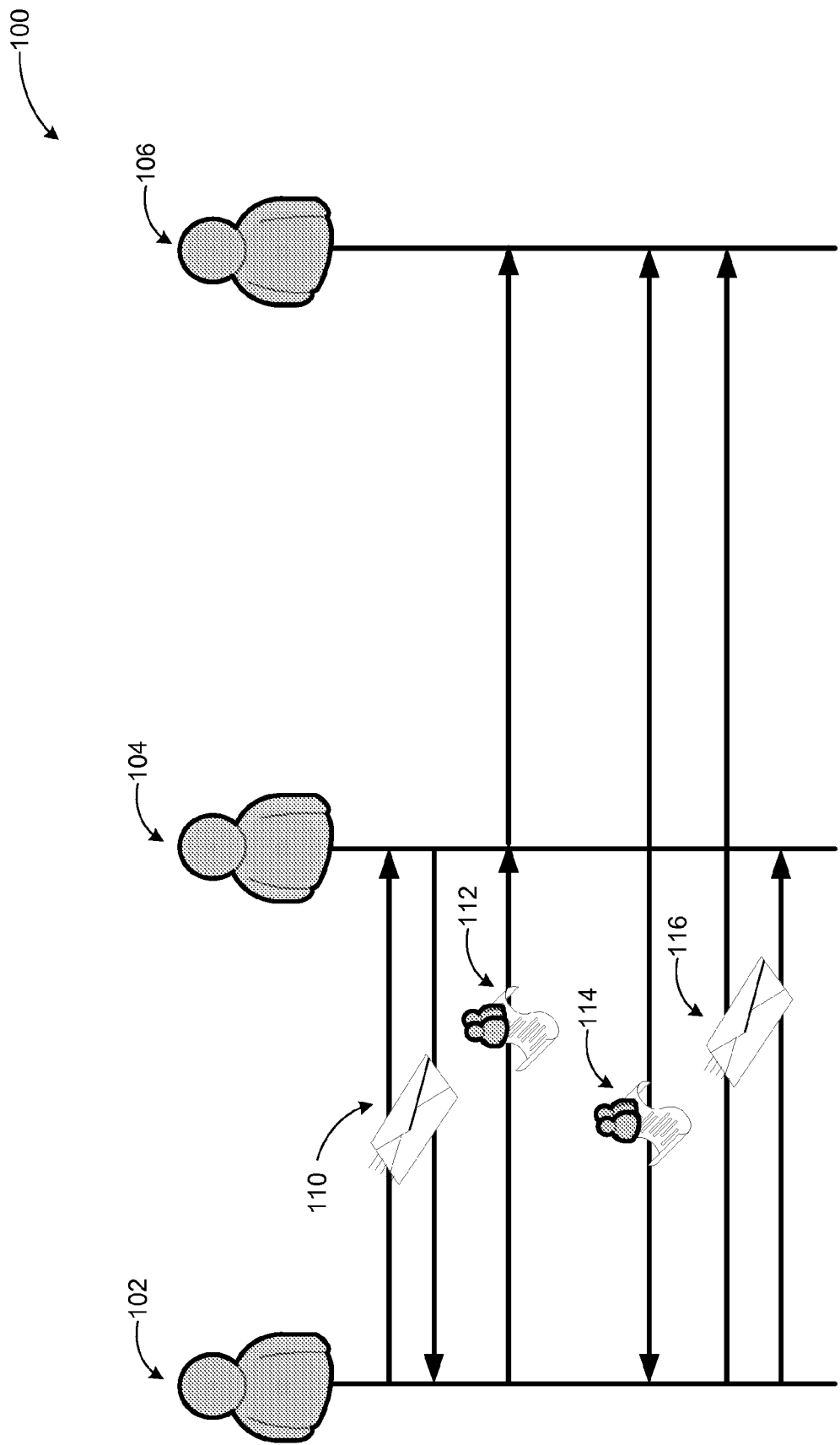
FIG. 1 is a conceptual diagram illustrating conversion of exchanges of emails and real time communication messages between users.

As briefly described above, seamless transition between email and real time communication methods may be provided by automatically performing a number of tasks to include context of communication when a user traverses between the two forms of communication. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing alternate contacts lists. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "participant" is used to refer to people participating in an active chat session. This is to be distinguished from the term "member", which is used to refer to those permitted to access the chat room, but may not necessarily participate in an active chat session.

FIG. 1 is a conceptual diagram illustrating conversion of exchanges of emails and real time communication messages between users. Diagram 100 shows example exchanges between three users of an enhanced communication system that can accommodate emails, instant messages, group chats, and other forms of communication. Example email exchange 110 between users 102 and 104 may include a trail of connected messages (e.g. replies, forwarded messages, and the like), attached textual documents, images, audio/video recordings or similar data. Moreover, the email exchange may include additional information such as participating users' contact information such as their email addresses, other contact information (e.g. physical addresses, organizational positions, images, etc.) or even presence information associated with the users.

At some point during the email conversation, user 102 may decide to convert the conversation to a real time conversation using text message exchange or group chat 112. A system according to embodiments may first determine the contacts (e.g. users 104 and 106) based on the recipients of the exchanged emails. The determination may be automatic based on predefined rules (e.g. all recipients in the "To" field or all recipients in the "To" and "Cc" fields). Alternatively, the user (102) may be provided with the option of adding or deleting contacts for the real time communication.

A history of the email exchange may be made available to the members of the real time conversation to provide context. Furthermore, other related information such as documents attached to the exchanged emails, links in the emails, and similar information may be made available to the members of the real time communication as well (e.g. as part of the chat room in a group chat).

According to another example scenario, users 102 and 106 may participate in a real time communication session exchanging text messages. These messages may also include links or have related documents (as part of the chat room). At some point during the conversation, user 102 may decide to change the communication to email and send a first email to users 104 and 106. The system may pre-populate the email with user 106 as default contact (to which user 104 may be added by user 102 manually) and include the exchanged text message trail and any related documents or links as context for the first email. Thus, a seamless transition from the real time conversation to an email exchange may be accomplished with the automatic tasks performed by the system.

Figure 2:
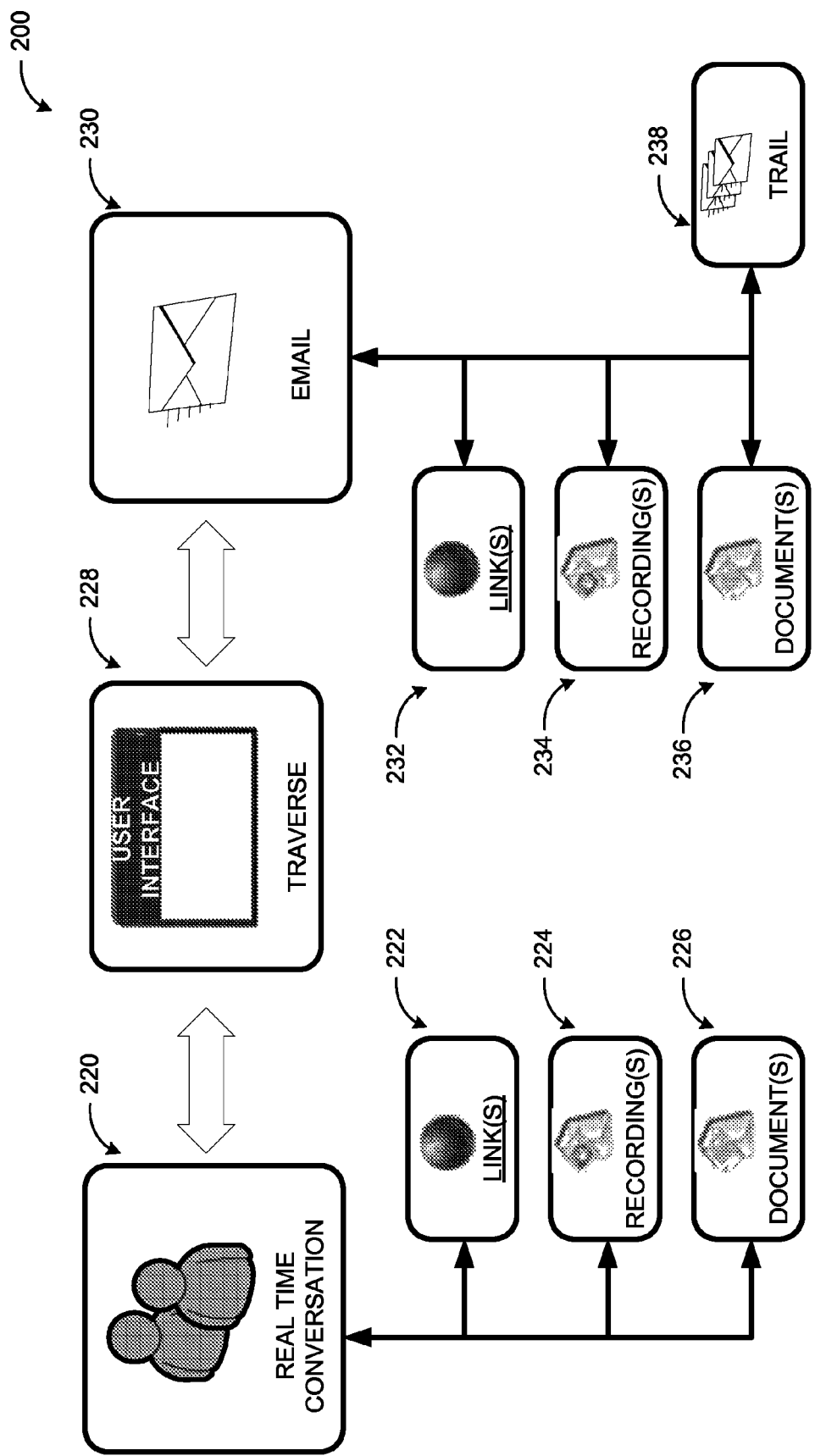
FIG. 2 illustrates major components of email and real time communication systems taken into consideration when traversing between the two communication forms according to embodiments.

FIG. 2 illustrates major components of email and real time communication systems taken into consideration when traversing between the two communication forms according to embodiments.

As mentioned above, a real time conversation 220 may include associated elements such as links 222, recordings 224, documents 226, and other data (non-textual files). Similarly, an email exchange 230 may include associated elements like links 232, recordings 234, attached or inserted documents 236, and a trail of email exchanges 238 (as part of the email conversation). In a system according to embodiments, users are enabled to seamlessly traverse between these two communication forms through a user interface 228.

The traversal may be enabled through the user interface of a distinct real time conversation application (e.g. a text messaging application), the user interface of an email application, or the user interface of a combined communication application that can facilitate both forms of communication. The user may be enabled to switch from one form to the other by activating a graphical element (e.g. a button) of the user interface or indicating their desire through other means such as hovering over or clicking on a user interface element associated with the desired communication mode. According to further embodiments, a conversion notification may be sent to a desired audience for purposes of tracking and/or easy access to the exchanged information via the email and real time modes.

A notification to the desired audience may be in form of an email and include a "Join the Chat" option, which may automatically launch a chat application, and join the recipient of the notification in the chat session, displaying contextual information as described herein. Alternatively, the notification may include an email digest option, which may provide the recipient with a summary of messages from the group chat, delivered by email. The digest may be delivered as soon as there are sufficient messages to merit delivery, or after a fixed period of time has elapsed.

Prior messages from emails may not readily translate to group chat message history in some cases, for example, due to the possibility that message authors may or may not be registered users of the chat system. For this reason, the message may be reconstructed in the form of a single chat message in story form, which is typically used for longer postings. Additionally, a message in story form typically includes a topic, which is a convenient parallel with email messages, and provides a clean transition from the email to the chat.

Contacts in the desired communication mode may be populated automatically based on a context of the previous conversation, participation in the previous conversation, or based on documents or links associated with the previous conversation. Context information provided in the new communication mode (e.g. email) may be formatted, filtered, and/or optimized automatically based on predefined rules. Filtering may also be based on privacy and/or security concerns. For example, content of emails marked as private may not be provided as part of the context in the real time conversation. Similarly, a filtering of included information (content, attachments, etc.) may be based on permission levels of the members in the new communication mode. Different ordering approaches may be employed when converting email messages from multiple threads to a single real time conversation taking into consideration temporal order of the emails as well as their grouping by the different threads.

As contacts for the desired form of communication are determined, attributes of contacts from the previous form of communication may also be considered. For example, presence information associated with recipients of emails may be taken into account when populating contacts for the real time conversation following the email exchange. If one of the recipients is listed as being out of office (but may still respond to email), that recipient may be removed from the contacts for the real time conversation. Some conventional email systems have system defined or user defined categories for messages (e.g. importance based, action based, etc.). Such message properties may also be carried over to the real time conversation as part of the context information.

Figure 3:
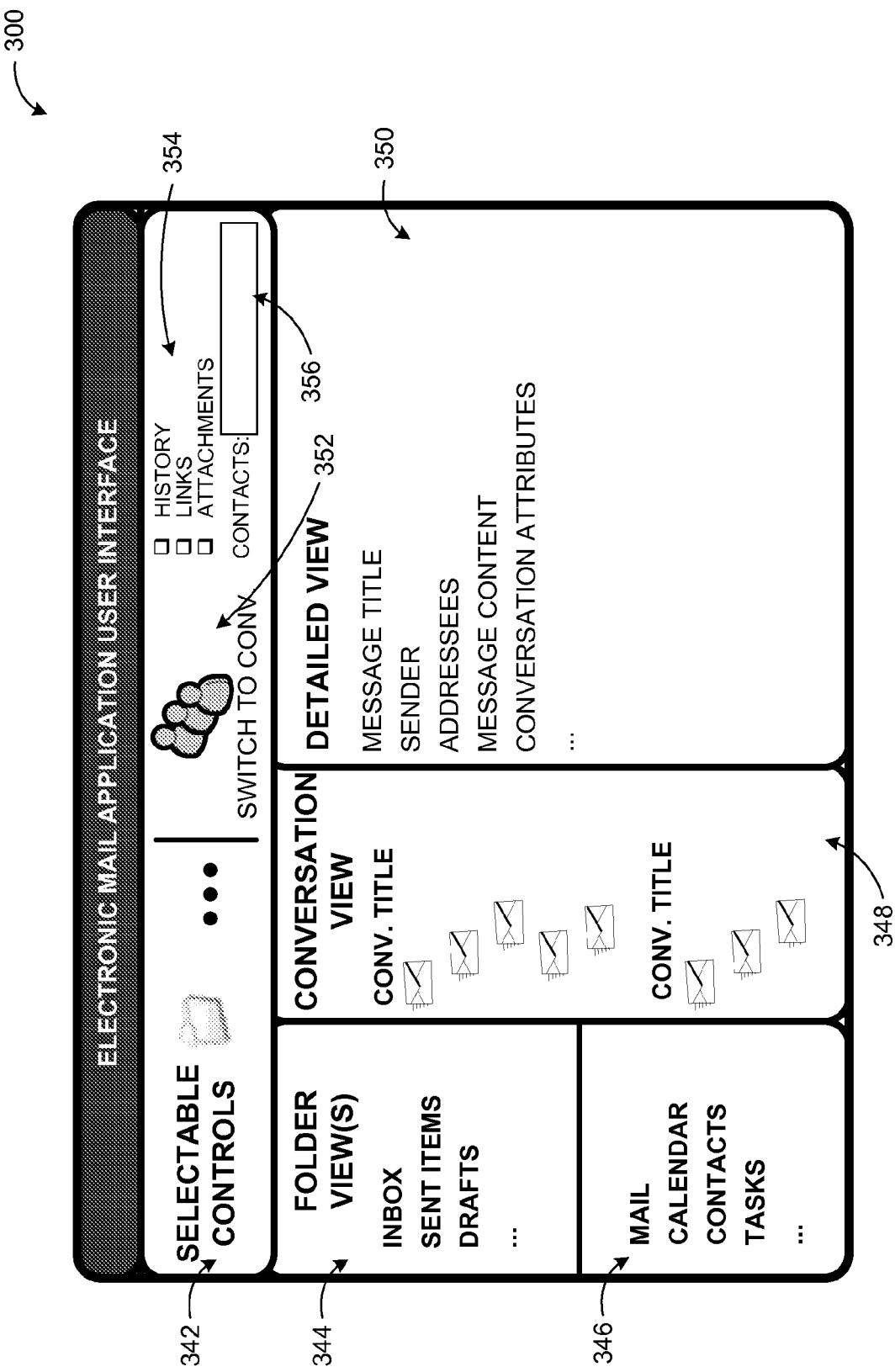
FIG. 3 is an example user interface for an email application enabling users to traverse to real time communications from email according to embodiments.

FIG. 3 is an example user interface for an email application enabling users to traverse to real time communications from email according to embodiments. As discussed previously, traversal between an email conversation and a real time conversation may be enabled through the user interfaces of distinct email or chat applications, or through the user interface of a combined communication application. User interface 300 is an example of an email application user interface that enables users to switch to a real time conversation.

User interface 300 may include standard components such as selectable controls 342, links to other functionalities 346 such as calendar, contacts list, task list, and so on. Selectable controls 342 may include textually and/or graphically represented controls for standard operations. Folder view 344 provides a grouping of emails based on folder categories such as inbox, sent items, drafts, etc. Email user interface 300 may also include a conversation view 348 pane for displaying a list of available conversations with their properties.

Selected messages in the email application may be displayed in detailed view 350 pane with specific email information such as message title, sender, addressees, content, and so on. Message attributes like category of the message may also be displayed in textual or graphical form and taken into consideration when providing context after a switch to a real time conversation.

Messages in an email exchange may be part of multiple conversations at the same time when a conversation branches into several related conversations. Any message that is part of the shared history of those conversations may be effectively shared among the conversations. For example, a conversation that initially begins discussing email systems may branch into several distinct conversations on diverse topics such as spam, viruses, and networking technology. Any message in the original discussion about email may be effectively an element of all the other conversations, or conversation branches. Thus, when an email is traversed into a real time communication, context information associated with any conversations encompassing that email may be utilized to populate the context of the real time communication.

In addition to the above described standard email functionalities, user interface 300 also includes elements for traversing to real time conversation such as activation element 352 (graphical and textual). Contacts for the real time conversation may be determined by the system automatically based on the context, participants, and/or attachments of a currently selected email, or defined by the user through contact entry box 356. Similarly, context information for the real time conversation may be determined automatically by the system or at least a portion of the context information may be defined by the user through selection of options such as history, links, attachments (354).

Figure 4:
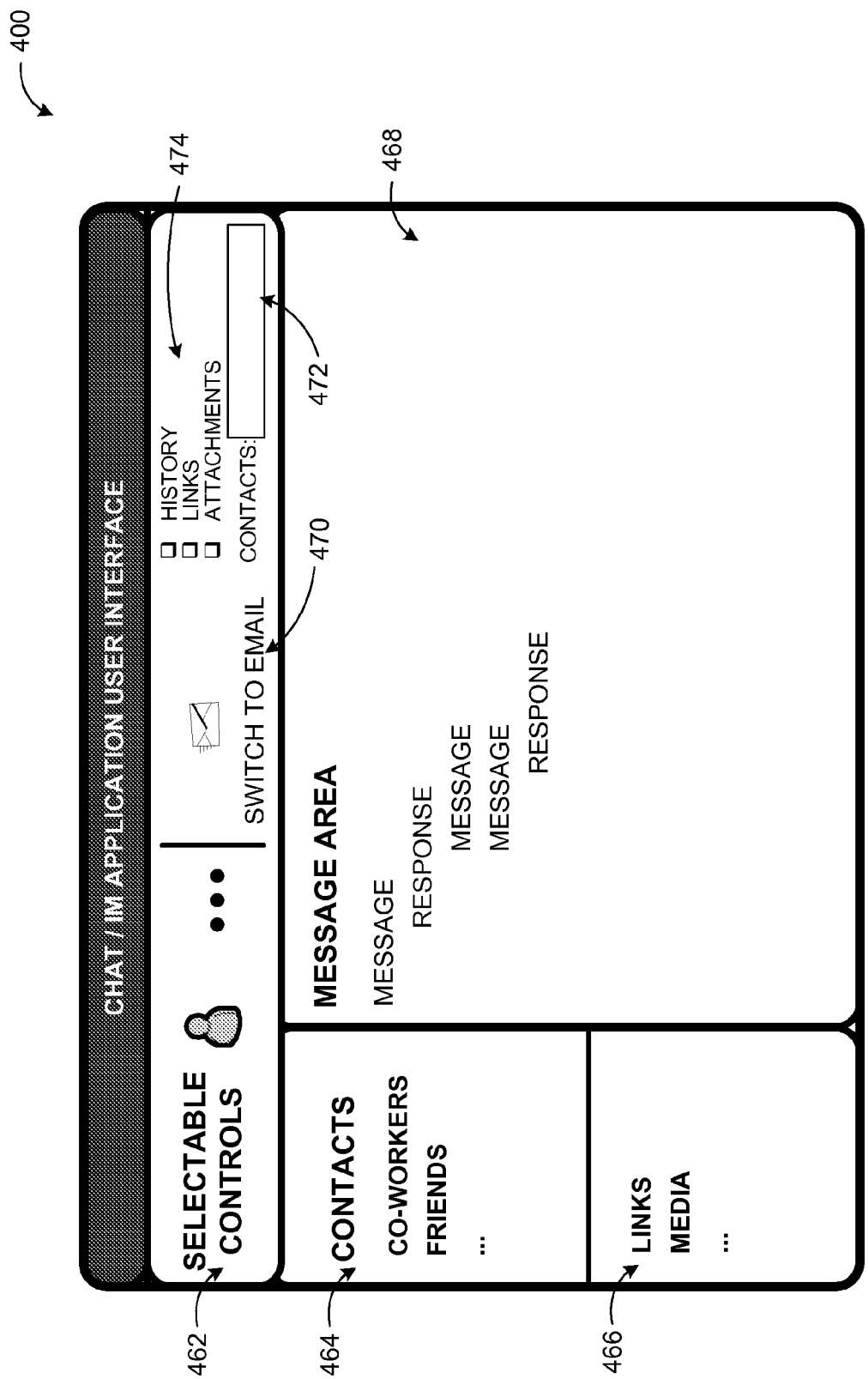
FIG. 4 is an example user interface for a real time communication application enabling users to traverse to email from real time communications according to embodiments.

FIG. 4 is an example user interface for a real time communication application enabling users to traverse to email from real time communications according to embodiments. User interface 400 for a real time chat application may include standard elements such as selectable controls 462 (e.g. for selecting participants, adding communication modes, setting the user's status, etc.), a contacts pane 464 listing contacts categorized by default or user defined groups (and their statuses), and a related information pane 466 listing links, media, documents, and similar data associated with the current conversation.

Message area 468 displays the exchange of textual messages, typically, according to a graphic or formatting scheme to make it easier for the user to see the flow of messages in the conversation. The contacts may be presented in groups as discussed above. These groups may be derived from an enterprise-wide directory server, a private address book, a system administrator, or determined from a context of the conversation. Each of the groups may be customized (e.g. filtered, ordered) based on pre-defined data mining or subscriber attribute rules. The contacts may be displayed in many forms including textual, graphical, and other forms of presentation, which may include additional functionality.

User interface 400 may enable the user to switch to an email exchange by selecting the traversal element 470 and entering contact(s) (472) to receive the email. The contact(s) for receiving the email may also be determined automatically by the system based on the context of the real time conversation (e.g. participants). The user may further be enabled to customize context information for the email by selecting options (474) such as history, links, attachments, etc. The context information may be included in the email as attachment or as part of the email content. As discussed above, appropriate filtering, optimization, and/or formatting may be performed based on default or user defined rules. For example, font and other attributes of text may be reformatted in the email according to the email application's default formatting requirements, duplications in the exchanged messages may be filtered through an optimization algorithm, and recipients may be evaluated based on their permission levels and attributes of the conversation content (e.g. privacy status). Furthermore, contacts in a blind courtesy copy field of emails may also be added or left out of the chat session based on security and privacy based rules.

While the example systems, components, and user interfaces in FIG. 1 through FIG. 4 have been described for specific illustration such as email application user interface, user interface elements, links, attachments, and the like, embodiments are not limited to these and can be implemented with other system components, configurations, and user interfaces employing fewer or additional components using the principles described herein.

Figure 5:
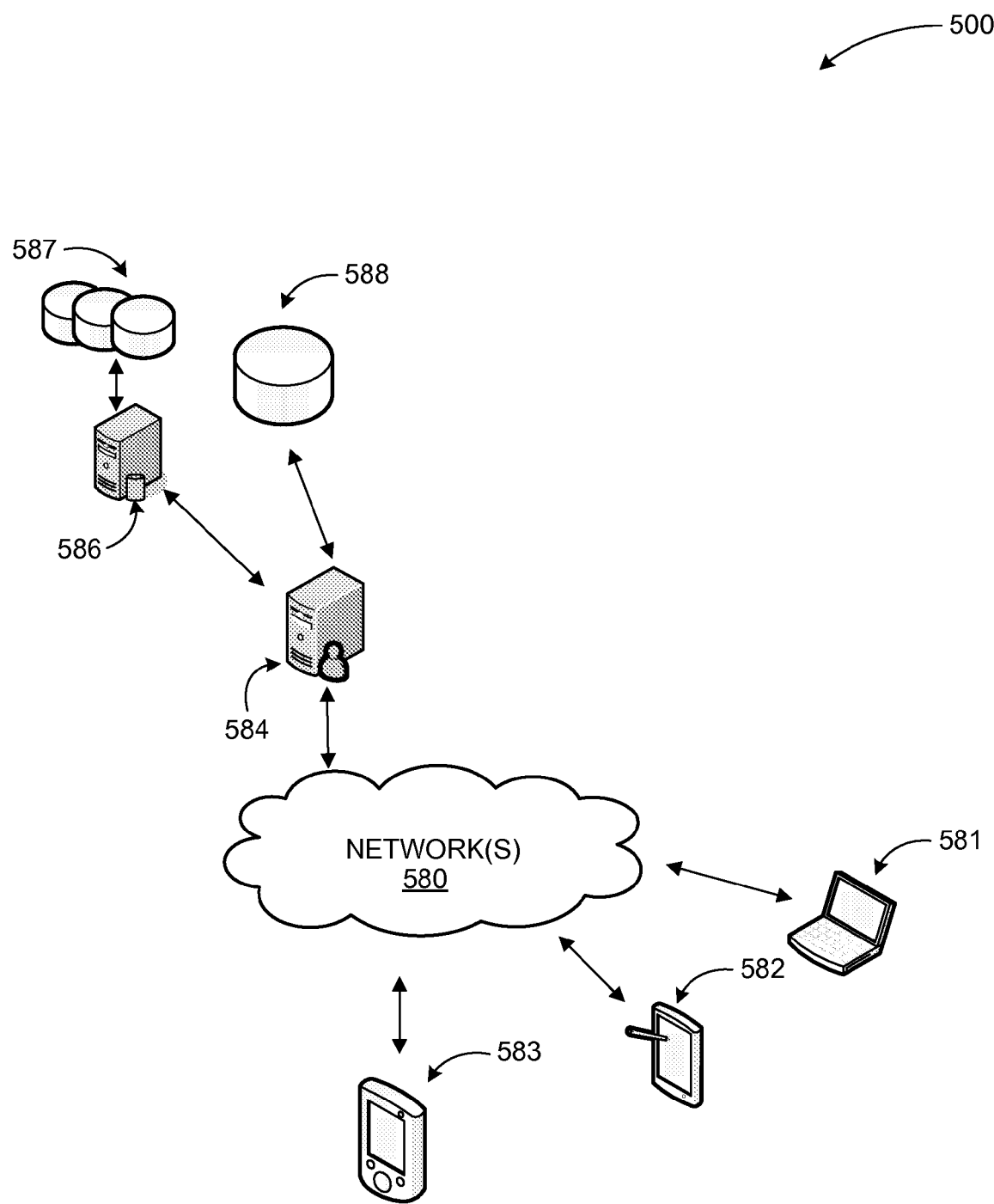
FIG. 5 is a networked environment, where a system according to embodiments may be implemented.

FIG. 5 is an example networked environment, where embodiments may be implemented. A platform providing communication services with email and real time conversation traverse may be implemented via software executed over one or more servers 584 such as a hosted service. The platform may communicate with client applications on individual computing devices such as a laptop computer 581, a handheld computer 582, and smart phone 583 ('client devices') through network(s) 580.

As discussed above, users may be enabled to switch between emails and real time conversation messages seamlessly through automatic provision of context information, selection of contacts, and similar operations. Client devices 581-583 are used to facilitate communications employing a variety of modes between subscribers of the communication system. Information associated with subscribers and facilitating communications with traversal between different modes may be stored in one or more data stores (e.g. data stores 587 or 588), which may be managed by server 584 or by database server 586.

Network(s) 580 may comprise any topology of servers, clients, Internet service providers, and communication media. A system according to embodiments may have a static or dynamic topology. Network(s) 580 may include a secure network such as an enterprise network, an unsecure network such as a wireless open network, or the Internet. Network(s) 580 may also coordinate communication over other networks such as PSTN or cellular networks. Network(s) 580 provides communication between the nodes described herein. By way of example, and not limitation, network(s) 580 may include wireless media such as acoustic, RF, infrared and other wireless media.

Many other configurations of computing devices, applications, data sources, and data distribution systems may be employed to implement a system for enabling seamless traverse between email and real time conversation exchanges. Furthermore, the networked environments discussed in FIG. 5 are for illustration purposes only. Embodiments are not limited to the example applications, modules, or processes.

Figure 6:
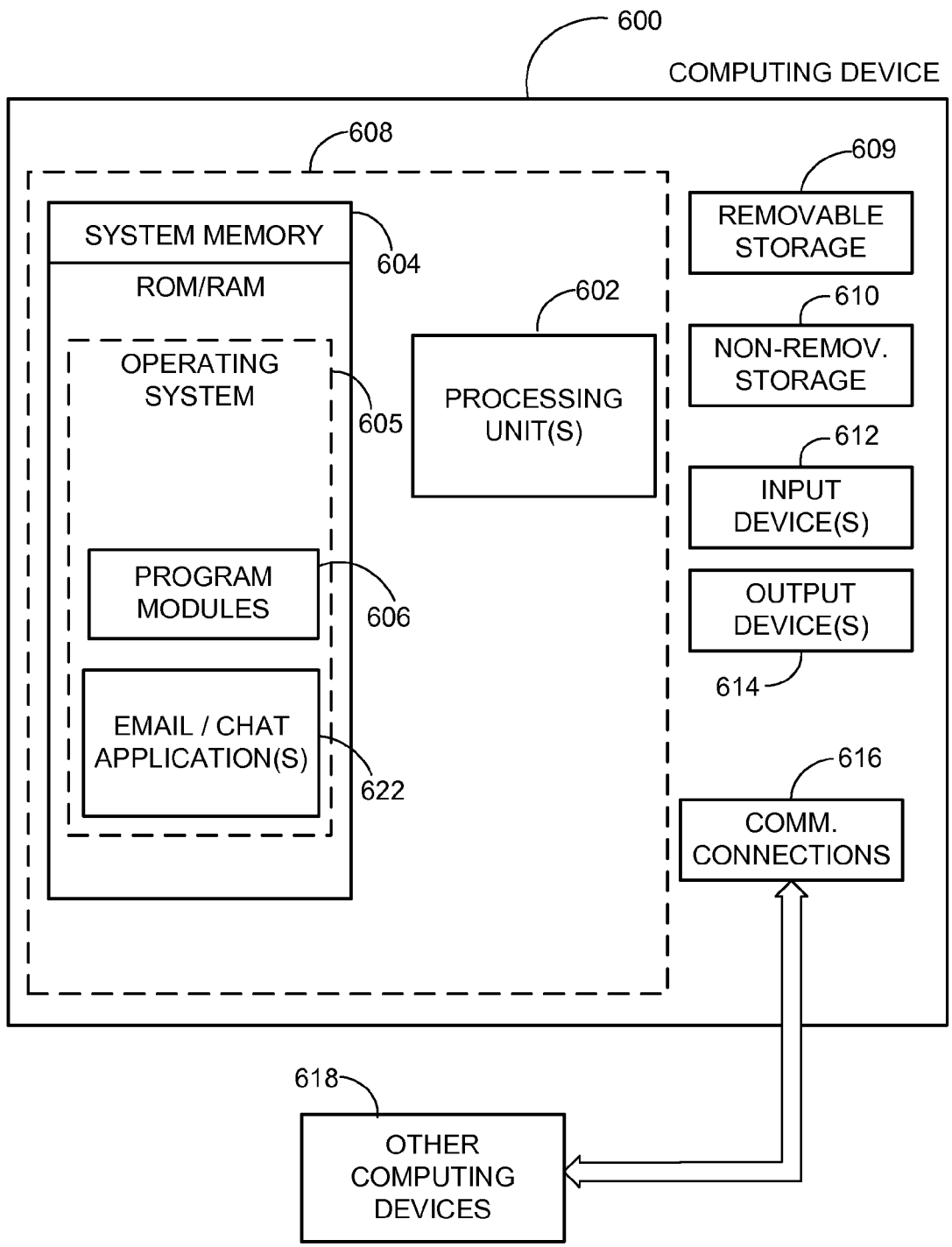
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a communication application (e.g. an email application, a real time communication application, or a combination of the two) and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606 and email/chat application(s) 622.

Email/chat application(s) 622 may be any application that facilitates email and/or real time communication between users. Such applications may also enable users to communicate in other modalities like audio, video, application sharing, data sharing, whiteboard sharing, and comparable ones. Email/chat application(s) 622 enable users to seamlessly traverse between email exchanges and real time communications by selecting contacts automatically and providing context information for the switched mode of communication. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
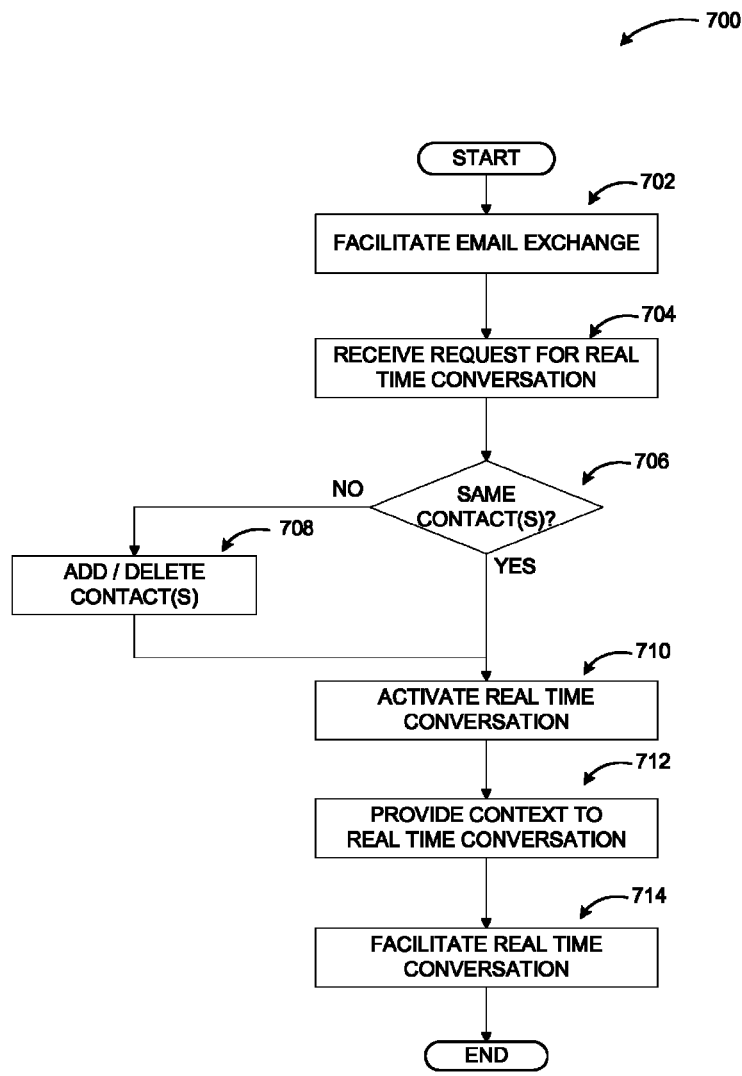
FIG. 7 illustrates a logic flow diagram of a process for traversing from email to real time communications according to embodiments.

FIG. 7 illustrates a logic flow diagram of process 700 for traversing from email to real time communications according to embodiments. Process 700 may be implemented as part of an enhanced communication system capable of facilitating multiple forms of communications.

Process 700 begins with optional operation 702, where an email exchange is facilitated between two or more users. At operation 704, a request is received from one of the users to traverse into a real time conversation such as text message exchange, group chat, or other forms of communication. A system according to embodiments determines contacts for the desired real time conversation automatically based on recipients of the email exchange, context of the emails, or other sources.

At decision operation 706, a determination is made whether the same contacts are to be used for the desired real time conversation. The requesting user may be enabled to add or delete contacts for the real time conversation at operation 708. If the system determined contacts are to be used, the real time conversation is activated at operation 710 with context for the real time conversation being provided at operation 712 based on the email exchange. The context may include links, documents, email content, and other information provided to the participants of the real time conversation as background in the message exchange, as items in a chat room, or in other forms.

With the context information being provided based on the email exchange, the real time conversation is facilitated at operation 714 by enabling the users to exchange textual messages, audio messages, video messages, or other forms of communication. The participants of the chat session and recipients of the email may further be determined from a contacts list based on a user preference, an organizational default rule, and/or attributes of contacts list entries.

Figure 8:
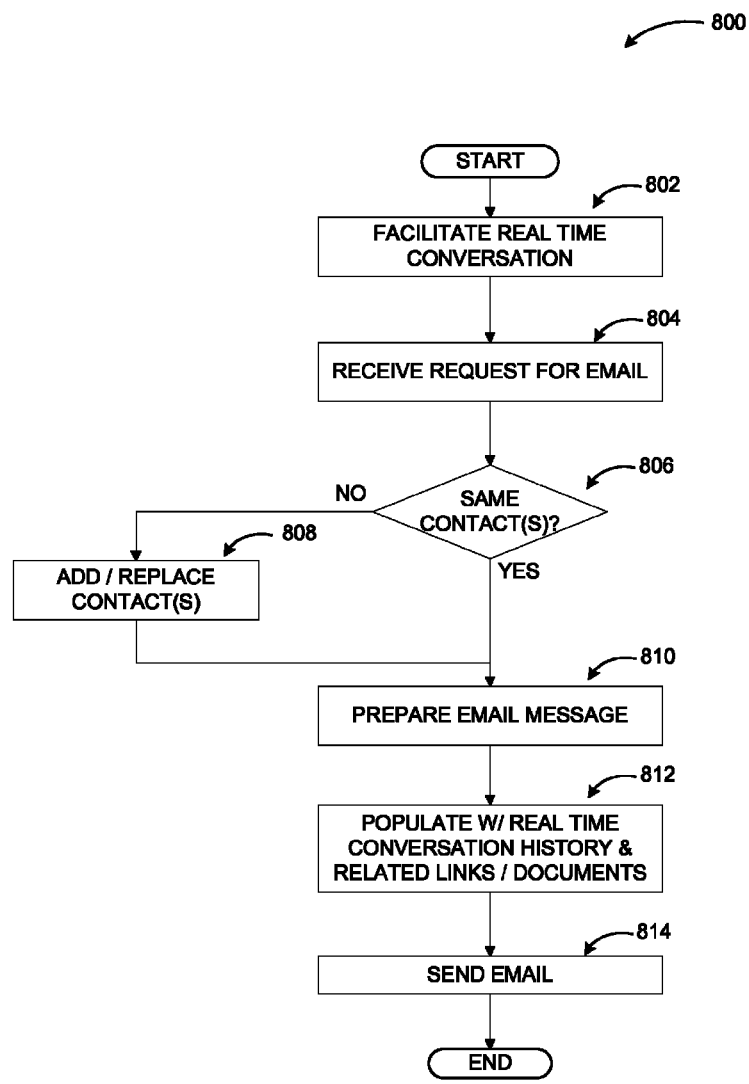
FIG. 8 illustrates a logic flow diagram of a process for traversing from real time communications to email according to embodiments.

FIG. 8 illustrates a logic flow diagram of process 800 for traversing from real time communications to email according to embodiments. Process 800 begins with operation 802, where a real time communication such as a text message exchange or group chat (along with other companion communication modes) is facilitated.

At operation 804, a request is received from one of the participants to start an email exchange based on the real time conversation. A system according to embodiments determines contacts for the desired email exchange automatically based on the participants of the real time conversation, context of the conversation, or other sources.

At decision operation 806, a determination is made whether the same contacts are to be used for the desired email exchange. The requesting participant may be enabled to add or delete contacts for the email exchange at operation 808. If the system determined contacts are to be used, the email message is prepared at operation 810 with the message being populated with context information such as history of the real time conversation (message trail), related links, related documents, and so on at operation 812. The context information may be included in the content of the email message or provided as attachments. With the context information being provided based on the real time conversation, the email exchange is facilitated at operation 814 by sending the email message to the recipients.

The operations included in processes 700 and 800 are for illustration purposes. Traversing between email and real time communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for enabling traversal between an email exchange and a real time conversation, the method comprising:
while facilitating a first email exchange including a trail of connected messages, replies and forwarded messages, receiving a request for activating a first real time conversation that includes at least one from a set of: audio communication, video communication, application sharing, and data sharing based on an email of the first email exchange, wherein the first email exchange is part of two or more conversations concurrently;
ordering the first email exchange according to at least one from a set of: a temporal order and a grouping by different threads;
reconstructing the email exchange in a story form including a topic to facilitate transitioning from the first email exchange to the first real time conversation;
determining participants of the first real time conversation based on a context of the first email exchange and a user entry in an entry box presented on a user interface;
populating the participants of the first real time conversation according to presence information associated with recipients of the first email exchange;
excluding at least one of the participants of the email exchange based on permission levels and attributes of the first email exchange content;
activating the first real time conversation, wherein a context for the first real time conversation is provided based on the context of the email and formatted based on a set of predefined rules and a user preference; and
displaying the first real time conversation over the user interface wherein the user interface includes textual and graphical selectable controls, links to functionalities including one or more of: a calendar, a contact list that lists contacts categorized by user defined groups and their statuses, and a task list, a folder view providing a grouping of emails based on folder categories, a detailed view pane, and a conversation view pane displaying a list of available conversations and associated properties.

2. The method of claim 1, further comprising:
while facilitating a second real time conversation, receiving a request for activating a second email exchange based on the second real time conversation;
determining recipients for the second email exchange based on at least one of the participants of the second real time conversation and a context of the second real time conversation; and
preparing an email for the second email exchange, wherein the email is populated with information based on the context of the second real time conversation.

3. The method of claim 2, wherein the context of the first and second email exchanges and the context of the first and second real time conversations include an exchanged content, exchanged links, and exchanged documents.

4. The method of claim 2, wherein the real time conversation includes one of a text message exchange and a group chat session.

5. The method of claim 2, further comprising:
filtering at least one of the participants of the first real time conversation, recipients of the second email exchange, a content of the first real time conversation, and the content of the email based on one of: the security rule, a privacy rule, and a user defined rule.

6. The method of claim 2, further comprising:
providing a conversion notification message to desired participants of the first real time conversation, wherein the conversion notification message includes at least one of an option to join the first real time conversation and an option to receive an email digest of exchanged messages within the first real time conversation.

7. The method of claim 2, further comprising:
optimizing the context of the first real time conversation and a content of the email for the second email exchange by removing duplicated information.

8. The method of claim 1, wherein the context of the email includes an attribute of the email comprising at least one from a set of: a status category of the email, an action category of the email, and an addressee status of the recipients of the email.

9. The method of claim 1, wherein the email is part of an email conversation, and wherein the context for the first real time conversation is further provided based on an attribute of the email conversation.

10. A computing device capable of executing a multimodal communication application, comprising:
- a memory;
- a data store;
- a processor coupled to the memory and the data store, the processor being arranged to execute the multimodal communication application, wherein the multimodal application is configured to:
  - while facilitating an email exchange including a trail of connected messages, replies and forwarded messages, receive a request for activating a communication session based on the email exchange, the communication session including at least one from a set of: audio communication, video communication, application sharing, and data sharing wherein the first email exchange is part of two or more conversations concurrently;
  - display the email exchange conversation in a folder view on a user interface, wherein the user interface includes textual and graphical selectable controls, links to functionalities including one or more of: a calendar, a contact list that lists contacts categorized by user defined groups and their statuses, and a task list, the folder view providing a grouping of emails based on folder categories, a detailed view pane, and a conversation view pane displaying a list of available conversations and associated properties, and wherein the email exchange in the folder view is grouped based on folder categories including at least one from a set of: inbox, sent items, and drafts;
  - reconstruct the email exchange in a story form including a topic to facilitate transitioning from the email exchange to the communication session;
  - determine participants of the communication session based on at least one of the participants of the email exchange, a context of the email exchange, and a user entry in an entry box presented on the user interface;
  - include information from an original discussion and associated conversation branches having a shared history with the email exchange in the context of the email exchange;
  - exclude at least one of the participants of the email exchange in a blind courtesy copy field of the email exchange from the participants of the communication session based on one of a privacy rule, a security rule, and a user defined rule, wherein the privacy rule is based on permission levels and attributes of the communication session content; and
  - activate the communication session, wherein a context for the communication session is provided based on the context of the email exchange;
  - while facilitating another communication session, receive a request for preparing an email based on the other communication session;
  - determine recipients for the email based on at least one of the participants and a context of the other communication session; and
  - populate the email with context information based on the context of the other communication session.

11. The computing device of claim 10, wherein the processor is further arranged to:
- provide a user interface for the multimodal communication application that includes at least one from a set of: a communication mode change element for switching between a communication session and an email exchange, a graphical element for initiating a communication session from an email, and a graphical element for initiating an email from a communication session.

12. The computing device of claim 11, wherein the processor is further arranged to:
- provide one of: an email user interface capable of initiating a communication session from an email, a communication session user interface capable of initiating an email from a communication session, and a combined user interface capable of switching between a communication session and an email exchange.

13. The computing device of claim 10, wherein the multimodal communication application is further configured to:
- include at least one of a link, a document, and a non-textual file within the email as one of: an attachment and as part of a content of the email based on a context of the communication session.

14. The computing device of claim 10, wherein the participants of the communication session and recipients of the email are further determined from a contacts list based on at least one from a set of: a user preference, an organizational default rule, and attributes of contacts list entries.

15. A computer-readable memory device with instructions stored thereon for enabling users to traverse between an email exchange and a real time conversation, the instructions comprising:
- receiving a request for initiating a communication session based on an email exchange including a trail of connected messages, replies and forwarded messages, the communication session including at least one from a set of: audio communication, video communication, application sharing, and data sharing wherein the first email exchange is part of two or more conversations concurrently;
- displaying the email exchange conversation in a folder view on a user interface, wherein the user interface includes textual and graphical selectable controls, links to functionalities including one or more of: a calendar, a contact list that lists contacts categorized by user defined groups and their statuses, and a task list, the folder view providing a grouping of emails based on folder categories, a detailed view pane, and a conversation view pane displaying a list of available conversations and associated properties, and wherein the email exchange in the folder view is displayed based on folder categories including at least one from a set of: inbox, sent items, and drafts;
- ordering the email exchange according to at least one from a set of: a temporal order and a grouping by different threads;
- reconstructing the email exchange in a story form including a topic to facilitate transitioning from the email exchange to the communication session;
- automatically determining participants of the communication session based on at least one of the participants of the email exchange and a context of the email exchange, wherein the participants of the communication session are filtered based on one of: a security rule, a privacy rule, and a user defined rule, wherein the privacy rule is based on permission levels and attributes of the communication session content;
- populating the participants of the communication session according to presence information associated with the participants of the email exchange;
- including information from an original discussion and associated conversation branches having a shared history with the email exchange in the context of the email exchange;

excluding at least one of the participants of the email exchange in a blind courtesy copy field of the email exchange from the participants of the communication session based on the privacy rule, the user defined rule, and the security rule;

initiating the communication session, wherein a context for the communication session is provided based on the context of the email exchange;

receiving a request for preparing an email based on another communication session;

automatically determining recipients for the email based on at least one of the participants and a context of the other communication session, wherein the recipients of the email are filtered based on one of: the security rule, the privacy rule, and the user defined rule; and populating the email with context information based on the context of the other communication session as one of: an attachment and as part of a content of the email.

16. The computer-readable memory device of claim 15, wherein the context for the communication session is provided as at least one from a list of: a link, a document, and a reference within a chat room associated with the communication session.

17. The computer-readable memory device of claim 15, wherein the instructions further comprise:
    filtering the context of the communication session and the content of the email based on one of: a security rule, a privacy rule, a user defined rule, and a duplication of data.

18. The computer-readable memory device of claim 15, wherein the instructions further comprise:
    enabling a user to modify the automatically determined participants of the communication session and recipients of the email.

* * * * *